United States Patent
Caba et al.

(10) Patent No.: US 9,927,234 B2
(45) Date of Patent: Mar. 27, 2018

(54) POSITION-MEASURING DEVICE AND METHOD FOR OPERATING THE SAME

(71) Applicant: DR. JOHANNES HEIDENHAIN GmbH, Traunreut (DE)

(72) Inventors: Costica Caba, Braunau am Inn (AT); Andreas Pommer, Burgkirchen (AT); Paul Andrei Tutzu, Braunau am Inn (AT); Victor Vasiloiu, Braunau am Inn (AT)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 128 days.

(21) Appl. No.: 15/218,089

(22) Filed: Jul. 25, 2016

(65) Prior Publication Data

US 2017/0030713 A1    Feb. 2, 2017

(30) Foreign Application Priority Data

Jul. 27, 2015   (EP) .................................... 15178402

(51) Int. Cl.
*G01B 21/00* (2006.01)
*G01B 21/16* (2006.01)
*G01D 5/244* (2006.01)

(52) U.S. Cl.
CPC ......... *G01B 21/16* (2013.01); *G01D 5/24404* (2013.01)

(58) Field of Classification Search
CPC .............................. G01B 21/16; G01D 5/24404
USPC ........................................................... 33/706
See application file for complete search history.

(56) References Cited

U.S. PATENT DOCUMENTS

| 5,131,017 A | * | 7/1992 | Huber .................. G01D 5/2451 377/24 |
| 6,265,992 B1 | | 7/2001 | Hagl et al. |
| 7,031,031 B1 | * | 4/2006 | Strasser ............. G01D 5/24461 250/231.1 |

(Continued)

FOREIGN PATENT DOCUMENTS

| DE | 102007059536 A1 | 6/2009 |
| EP | 0872714 A1 | 10/1998 |

(Continued)

*Primary Examiner* — Yaritza Guadalupe-McCall
(74) *Attorney, Agent, or Firm* — Leydig, Voit & Mayer, Ltd.

(57) ABSTRACT

A position-measuring device includes a module configured to vary a signal period of a position-dependent sinusoidal analog scanning signal. A conversion unit is configured to receive the sinusoidal analog scanning signal and to generate therefrom a sinusoidal digital output signal having a varied signal period compared to the sinusoidal analog scanning signal. A digital-to-analog converter is configured to generate, from the sinusoidal digital output signal, a sinusoidal analog output signal having a varied signal period. The conversion unit is configured to change an operating mode in dependence upon a frequency of the sinusoidal analog scanning signal in such a way that in a case of higher frequencies of the sinusoidal analog scanning signal, the sinusoidal digital output signal is fed to the digital-to-analog converter at a higher output rate and with a smaller word width than in a case of lower frequencies of the sinusoidal analog scanning signal.

13 Claims, 4 Drawing Sheets

(56) References Cited

U.S. PATENT DOCUMENTS

| | | | | |
|---|---|---|---|---|
| 7,092,108 | B2* | 8/2006 | Drescher | G01D 5/24452 |
| | | | | 250/227.26 |
| 7,129,698 | B2* | 10/2006 | Herzer | G01D 5/24404 |
| | | | | 324/207.11 |
| 7,251,575 | B2* | 7/2007 | Hiller | G01D 5/24409 |
| | | | | 702/94 |
| 7,333,911 | B2* | 2/2008 | Hofbauer | G01D 5/244 |
| | | | | 702/150 |
| 9,627,898 | B2* | 4/2017 | Beaury | H02J 7/0042 |
| 9,835,430 | B2* | 12/2017 | Fischer | G01B 3/1061 |
| 2005/0052179 | A1 | 3/2005 | Herzer | |
| 2006/0052973 | A1 | 3/2006 | Hiller | |
| 2009/0146858 | A1 | 6/2009 | Beseke et al. | |
| 2013/0265000 | A1* | 10/2013 | Beaury | H02J 7/0042 |
| | | | | 320/107 |
| 2014/0183346 | A1* | 7/2014 | Kato | G01D 5/34792 |
| | | | | 250/231.14 |
| 2017/0030713 | A1* | 2/2017 | Caba | G01D 5/24404 |

FOREIGN PATENT DOCUMENTS

| | | | |
|---|---|---|---|
| EP | 1399715 | B1 | 3/2004 |
| EP | 1606590 | B1 | 12/2005 |
| FR | 2792402 | A1 | 10/2000 |

\* cited by examiner

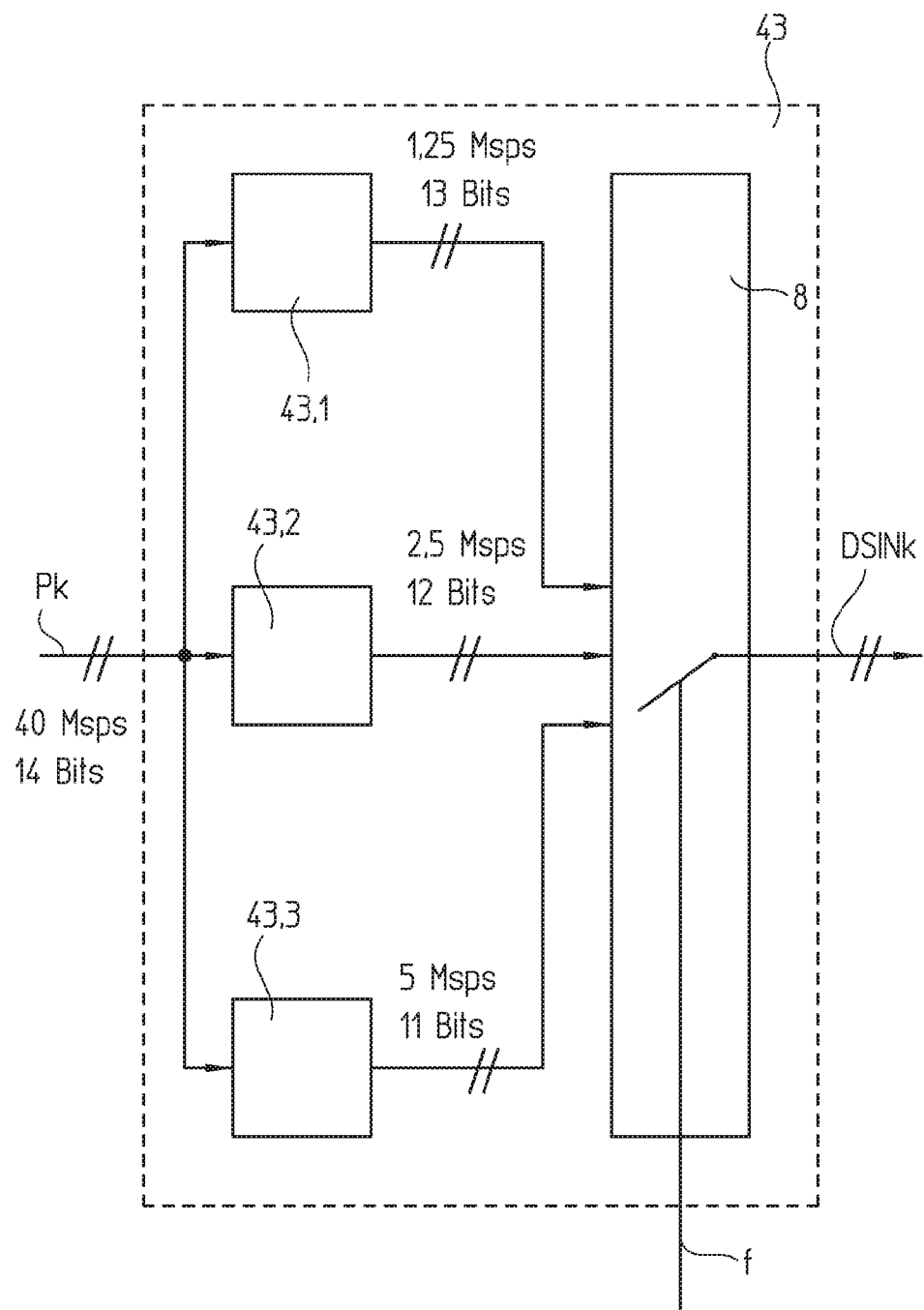

POSITION-MEASURING DEVICE AND METHOD FOR OPERATING THE SAME

CROSS-REFERENCE TO PRIOR APPLICATION

Priority is claimed to European Patent Application No. EP 15178402.2, filed on Jul. 27, 2015, the entire disclosure of which is hereby incorporated by reference herein.

FIELD

The present invention relates to a position-measuring device, and to a method for operating the same.

BACKGROUND

To measure the relative position of two machine parts, a measuring graduation is disposed on one of the machines parts, and a scanning unit is disposed on the other one of the relatively movable machine parts. During position measurement, the measuring graduation is scanned by the scanning unit, and position-dependent mutually phase-shifted analog scanning signals are generated.

Both the physical scanning principle and the grating period of the material measure need to be selected according to the intended use of the position-measuring device. In the case of magnetic and inductive scanning principles, only relatively large grating periods are feasible because of physical constraints. These scanning principles have the advantage of allowing for relatively large mounting tolerances. However, when scanning with a scanning unit, a large grating period produces analog scanning signals having a signal period that corresponds to this relatively large grating period. It has been found that these analog scanning signals have such a high quality that analog signals having a varied, in particular reduced, signal period can be generated therefrom using relatively simple means.

In the case of optical scanning principles, much smaller graduation periods are attainable than in the case of other scanning principles, making it possible to obtain analog scanning signals having a small signal period. However, this signal period may be too small for subsequent electronics, so that, here too, the signal period needs to be varied, in this case increased.

The analog output signals which are synthetically generated by the position-measuring device and whose signal period is reduced or increased compared to the scanning signals can be fed to subsequent conventional electronics for further processing.

Approaches for synthetically generating analog output signals having a varied signal period are found in EP 1 399 715 B1 and EP 1 606 590 B1. Our invention is based on EP 1 399 715 B1.

According to EP 1 399 715 B1, the variation, here reduction, of the signal period of two mutually phase-shifted sinusoidal analog scanning signals is accomplished by means of a module which receives the analog scanning signals as input signals and is adapted to generate therefrom two digital position signals which are representative of the position and whose frequency is a multiple of that of the input signals. These position signals are sequences of data words, each of which represents a value of the SIN signal or COS signal, respectively.

Connected downstream of this module is a digital-to-analog converter adapted to generate, from these digital sinusoidal position signals, mutually phase-shifted analog sinusoidal output signals whose frequency is a multiple of that of the scanning signals, and to make these analog sinusoidal output signals available at the output.

SUMMARY

In an embodiment, the present invention provides a position-measuring device including a module configured to vary a signal period of a position-dependent sinusoidal analog scanning signal. A conversion unit is configured to receive the sinusoidal analog scanning signal and to generate therefrom at least one sinusoidal digital output signal having a varied signal period compared to the sinusoidal analog scanning signal. A digital-to-analog converter is configured to generate, from the sinusoidal digital output signal, at least one sinusoidal analog output signal having a varied signal period. The conversion unit is configured to change an operating mode in dependence upon a frequency of the sinusoidal analog scanning signal in such a way that in a case of higher frequencies of the sinusoidal analog scanning signal, the sinusoidal digital output signal is fed to the digital-to-analog converter at a higher output rate and with a smaller word width than in a case of lower frequencies of the sinusoidal analog scanning signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows the configuration of an exemplary embodiment of the function generator from FIG. 2.

DETAILED DESCRIPTION

Figure 1:
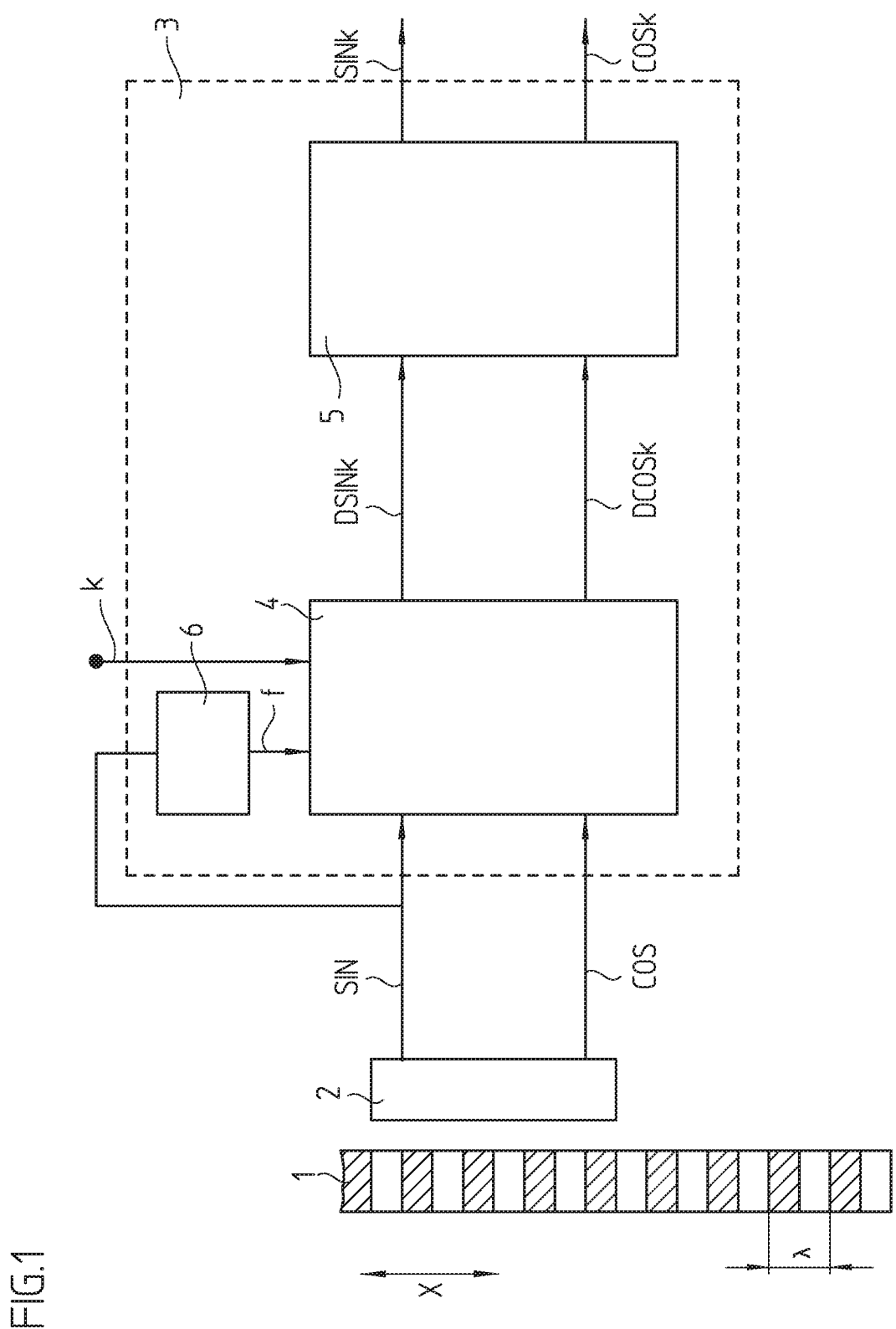
FIG. 1 shows a schematic view of the position-measuring device according to an embodiment of the present invention.

In an embodiment, the present invention provides a position-measuring device in which the quality of the sinusoidal analog output signals is improved.

The position-measuring device includes a module for varying the signal period of at least one position-dependent sinusoidal analog scanning signal. This scanning signal may be obtained by scanning a scale or using an interferometer.

The aforementioned module includes a conversion unit which receives the sinusoidal analog scanning signal and is adapted to generate therefrom at least one sinusoidal digital output signal having a varied signal period compared to the sinusoidal analog scanning signal. The module further includes a digital-to-analog converter adapted to generate, from the sinusoidal digital output signal, a sinusoidal analog output signal having a varied signal period.

The conversion unit is adapted to change the operating mode in dependence upon the frequency of the sinusoidal analog scanning signal in such a way that in the case of high frequencies of the sinusoidal analog scanning signal, the sinusoidal digital output signal is fed to the digital-to-analog converter at a higher output rate and with a smaller word width than in the case of low frequencies of the sinusoidal analog scanning signal.

Advantageously, the conversion unit is adapted to generate a plurality of digital output signals in parallel, the plurality of digital output signals having different output rates and different word widths. The plurality of digital output signals are fed in parallel to a switching unit which is adapted to feed one of these digital output signals to the digital-to-analog converter in dependence upon the frequency of the sinusoidal analog scanning signal.

Preferably, a plurality of mutually phase-shifted sinusoidal analog scanning signals of equal frequency are fed to the module during operation, this plurality of scanning signals being generated by a plurality of detectors of a scanning unit. If only one sinusoidal periodic scanning signal is generated by the scanning operation, this sinusoidal scanning signal may be interpolated using a synthetically generated scanning signal or, alternatively, using a non-sinusoidal signal obtained through scanning.

In a preferred embodiment, the conversion unit of the position-measuring device includes
an interpolation unit which receives the mutually phase-shifted sinusoidal analog scanning signals and is adapted to generate therefrom a digital position signal that is representative of the position within a signal period of the sinusoidal analog scanning signals;
a multiplier adapted to generate, from the digital position signal, a digital position signal having a varied signal period; and
a function generator adapted to generate the sinusoidal digital output signal from the digital position signal of varied signal period.

In another embodiment, the present invention provides a method which improves the quality of the sinusoidal analog output signals.

A method for operating a position-measuring device includes the following steps:
generating at least one position-dependent sinusoidal analog scanning signal, in particular by scanning an incremental scale;
generating at least one sinusoidal digital output signal from the at least one analog scanning signal, this output signal having a varied signal period compared to the sinusoidal analog scanning signal;
generating at least one sinusoidal analog output signal from the at least one sinusoidal digital output signal using a digital-to-analog converter;
the operating mode of the position-measuring device being changed in dependence upon the frequency of the sinusoidal analog scanning signal in such a way that in the case of high frequencies of the sinusoidal analog scanning signal, the sinusoidal digital output signal is fed to the digital-to-analog converter at a higher output rate and with a smaller word width than in the case of low frequencies of the sinusoidal analog scanning signal.

Preferably, a plurality of sinusoidal digital output signals are generated from the at least one analog scanning signal, these digital output signals having a varied signal period compared to the sinusoidal analog scanning signal, and the plurality of digital output signals having different output rates and different word widths.

This plurality of digital output signals are fed in parallel to a switching unit which feeds one of these parallelly received digital output signals to the digital-to-analog converter in dependence upon the frequency of the sinusoidal analog scanning signal.

The position-measuring device designed in accordance with the present invention, and the inventive method, have the advantage that a sufficient number of digital values are fed to the digital-to-analog converter within a signal period, even in the case of high frequencies of the analog scanning signals, while accepting that the word width of these digital values must decrease with increasing frequency in order to ensure optimal operation of the A/D converter.

Other details and advantages of the present invention are explained in the following description of an exemplary embodiment in conjunction with the figures.

The invention will now be described with reference to an example where the signal period variation is a reduction of the signal period. During operation of the position-measuring device, a reduction of the signal period results in a multiplication of the frequency of the output signal compared to the scanning signal. In the following, "k" refers to the multiplication factor. The multiplied frequency is accordingly
k×f, where k∈ℕ and f=frequency of the scanning signals However, the present invention is not limited to the reduction of the signal period. The variation may also be an increase of the signal period. Factor "k" is then to be selected as $$k \in \tfrac{1}{\mathbb{N}}, mit |\mathbb{N}| > 1$$

The principle of the present invention will be described with reference to the block diagram of FIG. 1, with k=2.

The position-measuring device includes a measuring graduation 1 having an incremental mechanical grating period λ. Mutually phase-shifted sinusoidal analog scanning signals SIN and COS of equal frequency f are generated in a known manner by a scanning unit 2 scanning periodic measuring graduation 1, where SIN=$A \sin(2\pi X/\lambda)$ COS=$A \cos(2\pi X/\lambda)$ where:
λ length of the signal period
X position
A signal amplitude These sinusoidal analog scanning signals SIN and COS having the signal period λ are fed as input signals to a module 3. Module 3 is adapted to generate, from these analog scanning signals SIN, COS, mutually phase-shifted sinusoidal analog output signals SINk and COSk having a multiplied frequency k×f; i.e., to perform frequency multiplication. In this connection, frequency multiplication means to generate an analog output signal SINk, COSk having a k-times higher frequency; i.e., having a k-times divided signal period λ.

The multiplication factor or multiplier k is selectable, and for example, is selected and permanently preset already during manufacture of the position-measuring device. Alternatively, the position-measuring device may be adapted to allow a user to select factor k from a plurality of possible values.

Module 3 includes a conversion unit 4 which receives sinusoidal analog scanning signals SIN and COS. Conversion unit 4 is adapted to generate, from analog scanning signals SIN and COS, mutually phase-shifted sinusoidal digital output signals DSINk, DCOSk which have a multiplied frequency k×f compared to sinusoidal analog scanning signals SIN, COS.

Thus, conversion unit 4, on the one hand, has the function of performing frequency multiplication and, on the other hand, has the function of converting analog scanning signals SIN, COS into digital output signals DSINk, DCOSk. Sinusoidal digital output signals DSINk, DCOSk are each defined by a sequence of bit patterns, each of which represents a sinusoidal waveform.

Digital output signals DSINk, DCOSk are fed to a digital-to-analog converter 5 of module 3, which is adapted to generate therefrom the sinusoidal analog output signals SINk and COSk. The information received as digital data by digital-to-analog converter 5 (parallelly received data words) is converted into an analog representation as a current or voltage. Each received bit pattern having a specific word width is associated with a specific, discrete current value or voltage value, where $$SINk = A\sin\left(\left(\frac{2\pi x}{\lambda}\right)k\right)$$

$$COSk = A\cos\left(\left(\frac{2\pi x}{\lambda}\right)k\right)$$

where:
λ length of the signal period
X position
A signal amplitude
k division factor, respectively multiplication factor.

Here, it is assumed that the signal amplitude A of analog output signals SINk, COSk is identical to the amplitude A of analog scanning signals SIN, COS. However, the signal amplitudes of analog output signals SINk, COSk may also differ from the amplitudes of analog scanning signals SIN, COS.

Since the sequence of the input signals of digital-to-analog converter 5 in each case represents a sinusoidal waveform, digital-to-analog converter 5 may have a linear quantization characteristic. In this connection, there is a linear relationship between the input quantity and the output quantity.

In accordance with the present invention, conversion unit 4 of module 3 is adapted to change the operating mode in dependence upon frequency f of sinusoidal analog scanning signal SIN, COS in such a way that in the case of high frequencies of sinusoidal analog scanning signal SIN, COS, sinusoidal digital output signal DSINk, DCOSk is fed to digital-to-analog converter 5 at a higher output rate and with a smaller word width than in the case of low frequencies of sinusoidal analog scanning signal SIN, COS.

Thus, in the case of high frequencies of scanning signals SIN, COS, the digital information applied to digital-to-analog converter 5 is updated at shorter intervals than in the case of low frequencies of sinusoidal analog scanning signals SIN, COS.

In addition, in the case of high frequencies of scanning signals SIN, COS, digital output signal DSINk, DCOSk is fed to digital-to-analog converter 5 with a smaller word width than in the case of low frequencies. A smaller word width means a reduced number of data bits, and thus reduced resolution.

To this end, a signal f which is proportional to the frequency of sinusoidal analog scanning signals SIN, COS is fed to conversion unit 4. The frequency-dependent output is provided to downstream digital-to-analog converter 5 in dependence upon this signal f.

To generate this frequency-dependent signal f, a component 6 is provided which receives at least one of the analog scanning signals SIN, COS. Frequency-dependent signal f may be determined in component 6, for example, by determining the number of signal periods per unit of time or, in the case of zero-symmetrical scanning signals SIN, COS, by determining the number of zero crossings per unit of time. Another possibility is to determine the number of clock pulses generated by a clock generator within a signal period or between two zero crossings.

Module 3 preferably forms part of scanning unit 2 and may be, for example, integrated in an ASIC.

Figure 2:
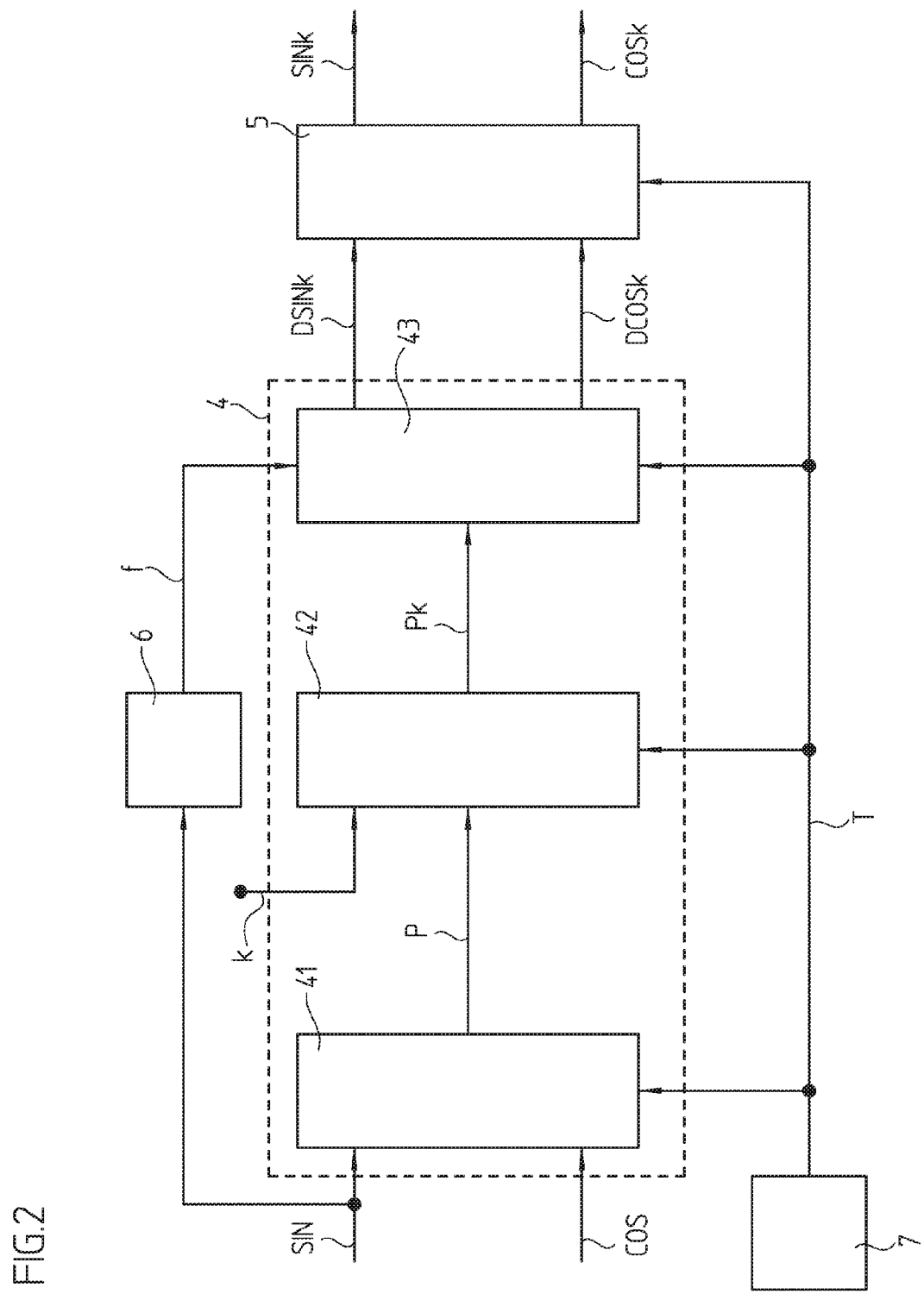
FIG. 2 shows a block diagram illustrating details of the configuration of FIG. 1.

FIG. 2 shows a block diagram which illustrates details of the configuration of FIG. 1. The input and output signals applied to and available from the components are illustrated in FIGS. 3a through 3e.

Conversion unit 4 includes an interpolation unit 41 which receives analog scanning signals SIN, COS and is adapted to generate therefrom a digital position signal P that is representative of the absolute position within a period λ of sinusoidal analog scanning signals SIN, COS. The function of interpolation unit 4 is well known. It includes, for example, an A/D converter for each of scanning signals SIN, COS, as well as a downstream circuit in which position signal P is generated with the period λ by generating the arctangent of the two digitized scanning signals received.

Figure 3A:
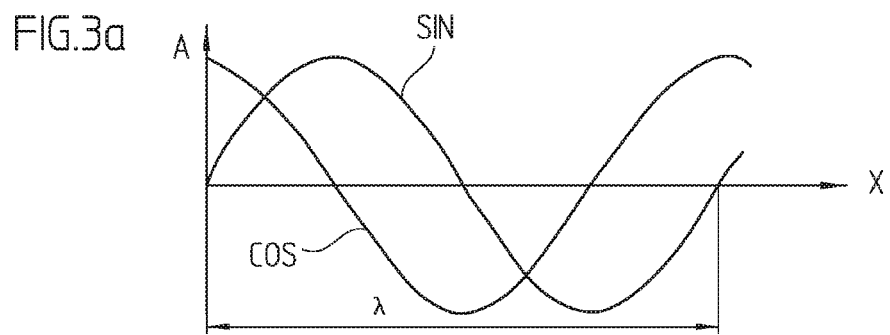
FIG. 3a shows two sinusoidal analog scanning signals which are phase-shifted by 90° with respect to each other.
Figure 3B:
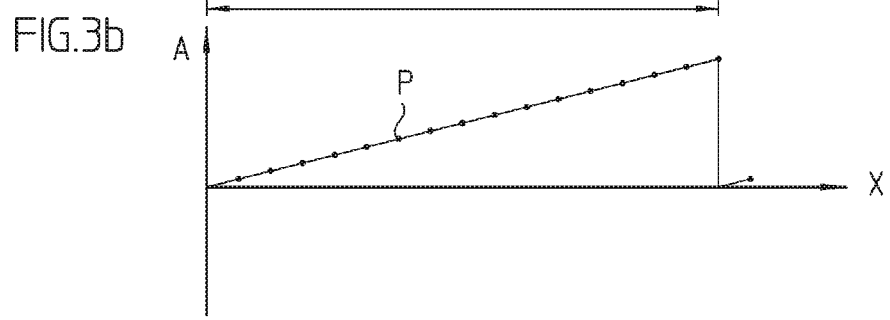
FIG. 3b shows a graph of the digital position signal.

Scanning signals SIN, COS are shown in FIG. 3a, in which amplitude A is plotted as a function of position X. Amplitude A may be a voltage value or a current value. The sawtooth shape of the digital position signal P generated therefrom is shown in FIG. 3b, in which the amplitude profile is represented by the sequence of digital words. In FIG. 3b, each point corresponds to one digital word.

Figure 3C:
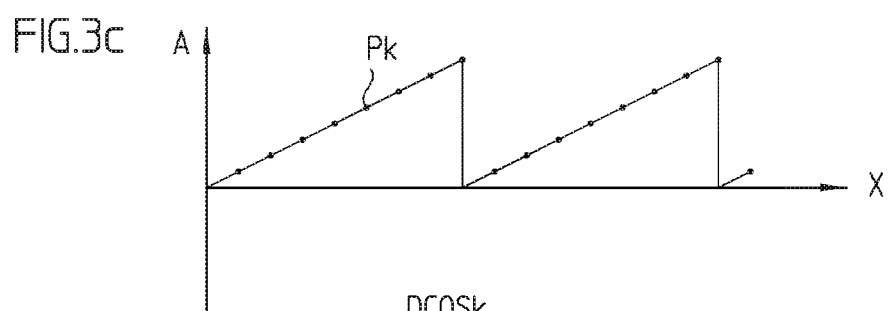
FIG. 3c shows a graph of the digital position signal whose frequency is a multiple of that of the position signal.
Figure 3D:
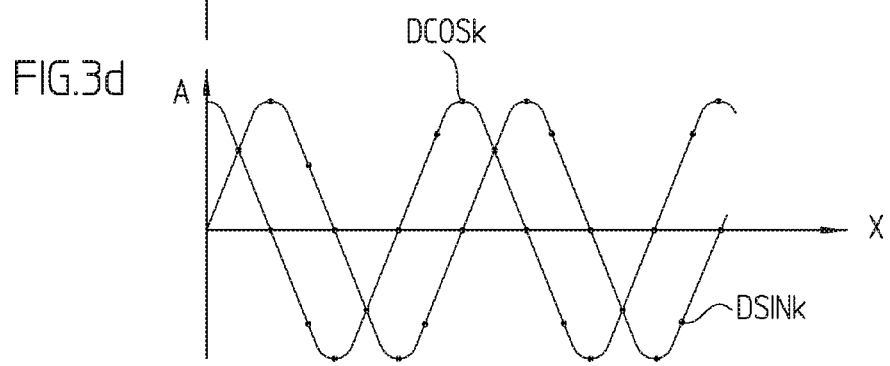
FIG. 3d shows a graph of the digital output signals of the conversion unit shown in FIG. 1 and FIG. 2.

Digital position signal P is fed to a multiplier 42 which generates, from digital position signal P, a digital position signal Pk having a multiplied frequency. Output signal Pk has the frequency k×f, with k=2 in this example. Accordingly, a period λ of scanning signals SIN, COS is divided by factor k. Digital position signal Pk is illustrated in FIG. 3c. Here, too, each point is defined by a digital word. Digital position signal Pk is fed to a function generator 43 which generates sinusoidal digital output signals DSINk, DCOSk therefrom. These output signals DSINk, DCOSk are shown in FIG. 3d. Again, each point is defined by a digital word. Function generator 43 has the function of correlating a position value Pk within period λ/k with a digital value (i.e., a data word) for sine or cosine, respectively. This correlation may be performed in various ways. For example, function generator 43 may generate sinusoidal digital output signals DSINk, DCOSk using tables (e.g., ROM) or using a calculation algorithm. Examples of such known calculation algorithms include the CORDIC algorithm and the Taylor series approximation.

Figure 3E:
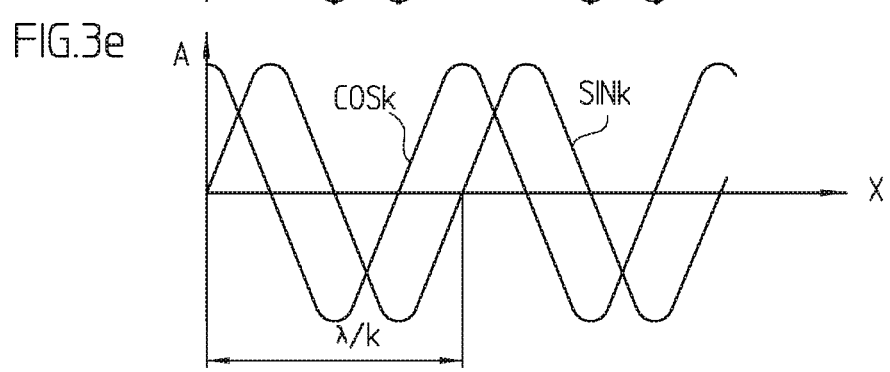
FIG. 3e shows the analog output signals.

Digital-analog converter 5 generates, from digital output signals DSINk, DCOSk, sinusoidal analog output signals SINk and COSk, which are shown in FIG. 3e.

In the schematic views of FIGS. 1 and 2, only one digital-analog converter 5 is shown. In practice, however, a separate digital-to-analog converter will be provided for each of digital input signals DSINk, DCOSk.

In the example shown, interpolation unit 41, digitally operating multiplier 42, function generator 43, and digital-analog converter 5, operate together at the same system clock T of, for example, 40 MHz, which is supplied from a clock generator 7. The instantaneous amplitude values of scanning signals SIN, COS are sampled, analog-to-digital converted and interpolated by interpolation unit 41 with this system clock T. In digital-analog converter 5, analog output signals SINk and COSk are also generated with this system clock T.

Function generator 43 changes the operating mode in dependence upon the instantaneous frequency of scanning signals SIN, COS; i.e., in dependence upon the frequency-dependent quantity f received, in such a way that in the case of high frequencies of sinusoidal analog scanning signals SIN, COS, sinusoidal digital output signals DSINk, DCOSk are fed to digital-to-analog converter 5 at a higher output rate and with a smaller word width than in the case of low frequencies of sinusoidal analog scanning signals SIN, COS.

In this connection, a higher output rate means that the digital information is fed to digital-to-analog converter 5 at shorter time intervals; i.e., that the digital information applied to digital-to-analog converter 5 is updated at shorter time intervals, than in the case of lower frequencies of scanning signals SIN, COS.

In addition, in the case of high frequencies of scanning signals SIN, COS, digital output signal DSINk, DCOSk is fed to the digital-to-analog converter with a smaller word width than in the case of low frequencies. This means that the word width changes in dependence upon frequency. In practice, less significant bits (LSBs) of data word DSINk, DCOSk are masked out by setting them to zero. In this manner, it is achieved that digital-to-analog converter 5 does not "see" the bits that are unstable at high frequencies, enabling the digital-to-analog converter to convert more stably and reliably.

With the aid of FIG. 4, the present invention will be described in further detail based on the generation of output signal DSINk. For this purpose, function generator 43 includes a plurality of blocks 43.1, 43.2, 43.3, to which position signal Pk is fed with a word width of, for example, 14 bits and at a rate of 40 Msps. Msps is the acronym for million samples per second. Blocks 43.1, 43.2, 43.3 are arranged in parallel and operate in parallel. In the example, three of these blocks 43.1, 43.2, 43.3 are shown, but the invention is not limited thereto. In practice, generally more than three such blocks 43.1, 43.2, 43.3 will be present.

First block 43.1 is configured to output data words having a width of 13 bits at an output rate of 1.25 Msps. This means that a new data word is present at the output every 800 ns.

Second block 43.2 is configured to output data words having a width of 12 bits at an output rate of 2.5 Msps. This means that a new data word is present at the output every 400 ns. A word width of 12 bits means that the LSB of the 13-bit word is masked out; i.e., permanently set to zero.

Third block 43.3 is configured to output data words having a width of 11 bits at an output rate of 5 Msps. This means that a new data word is present at the output every 200 ns. A word width of 11 bits means that the last two LSBs of the 13-bit word are masked out; i.e., permanently set to zero.

The outputs of all blocks 43.1, 43.2, 43.3 are fed to a switching unit 8 and one of these outputs of blocks 43.1, 43.2, 43.3 is fed to analog-to-digital converter 5 in dependence upon the instantaneous frequency of scanning signal SIN; i.e., in dependence upon frequency-dependent signal f.

For example, switching unit 8 switches the output of block 43.1 to the output of function generator 43 at frequencies from 0 Hz to 5 kHz, the output of block 43.2 at frequencies from 5 kHz to 20 kHz, and the output of block 43.3 at frequencies greater than 20 kHz.

For a given word width of the applied data word, the conversion speed of analog-to-digital converter 5 is proportional to the rate at which the data word changes. By means of the present invention, it is achieved that at higher frequencies of scanning signal SIN, and thus at higher relative speeds between measuring graduation 1 and scanning unit 2, the data word applied to analog-to-digital converter 5 changes more quickly than at low frequencies. At the same time, at higher frequencies of scanning signal SIN, the word width of the data word applied to analog-to-digital converter 5 is reduced.

Thus, the dynamic characteristics of digital-to-analog converter 5 are optimized by these inventive measures, so that analog output signals SINk and COSk are of high quality at all frequencies of scanning signals SIN, COS. The present invention ensures that a sufficient number of digital values are fed to digital-to-analog converter 5 within a signal period, even in the case of high frequencies of the scanning signals SIN, COS, while accepting that each of these digital values has a relatively small word width.

A filter for smoothing analog output signals SINk and COSk may be connected downstream of digital-to-analog converter 5. The filter may be, for example, a low-pass filter.

In the illustrated exemplary embodiment, two scanning signals SIN, COS which are phase-shifted by 90° with respect to each other are fed as input signals to module 3. However, the present invention is not limited thereto. In a manner not shown, it is also possible that only a single sinusoidal scanning signal, or more than two mutually phase-shifted scanning signals, in particular three sinusoidal scanning signals which are phase-shifted by 120° with respect to each other, may be fed as input signals to module 3.

The present invention can be successfully used with any physical scanning principle. The measuring graduation may be adapted to be scannable optically, magnetically, inductively or capacitively.

The position-measuring device may be configured as a linear measuring device or as an angle-measuring device. In the above formulas, position X represents a path length or an angle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device having a module configured to vary a signal period of at least one position-dependent sinusoidal analog scanning signal, comprising:
a conversion unit configured to receive the sinusoidal analog scanning signal and to generate therefrom at least one sinusoidal digital output signal having a varied signal period compared to the sinusoidal analog scanning signal; and
a digital-to-analog converter configured to generate, from the sinusoidal digital output signal, a sinusoidal analog output signal having a varied signal period,
wherein the conversion unit is configured to change an operating mode in dependence upon a frequency of the sinusoidal analog scanning signal in such a way that in a case of higher frequencies of the sinusoidal analog scanning signal, the sinusoidal digital output signal is fed to the digital-to-analog converter at a higher output rate and with a smaller word width than in a case of lower frequencies of the sinusoidal analog scanning signal.

2. The position-measuring device as recited in claim 1, wherein the digital-to-analog converter has a linear quantization characteristic.

3. The position-measuring device as recited in claim 1, further comprising a component configured to determine a signal which is proportional to the frequency of the at least one sinusoidal analog scanning signal, and to feed the signal to the conversion unit.

4. The position-measuring device as recited in claim 1, wherein the conversion unit is configured to generate a plurality of digital output signals in parallel, the plurality of digital output signals having different output rates and different word widths.

5. The position-measuring device as recited in claim 4, further comprising a switching unit to which the plurality of digital output signals are fed in parallel and which is configured to feed one of the digital output signals to the digital-to-analog converter in dependence upon the frequency of the sinusoidal analog scanning signal.

6. The position-measuring device as recited in claim 1, wherein, during operation, a plurality of mutually phase-shifted sinusoidal analog scanning signals of equal frequency are fed to the module.

7. The position-measuring device as recited in claim 6, wherein, during operation, two sinusoidal analog scanning signals which are phase-shifted by 90° with respect to each other are fed to the module.

8. The position-measuring device as recited in claim 6, wherein the conversion unit further comprises:
an interpolation unit configured to receive the mutually phase-shifted sinusoidal analog scanning signals, and to generate therefrom a digital position signal that is representative of the position within a signal period of the sinusoidal analog scanning signals;
a multiplier configured to generate from the digital position signal a digital position signal having a varied signal period; and
a function generator configured to generate the sinusoidal digital output signal from the digital position signal with the varied signal period.

9. A method for operating a position-measuring device, the method comprising:
generating at least one position-dependent sinusoidal analog scanning signal;
generating at least one sinusoidal digital output signal from the at least one analog scanning signal, the sinusoidal digital output signal having a varied signal period compared to the sinusoidal analog scanning signal;
generating at least one sinusoidal analog output signal from the at least one sinusoidal digital output signal using a digital-to-analog converter; and
changing an operating mode of the position-measuring device in dependence upon a frequency of the sinusoidal analog scanning signal in such a way that in a case of higher frequencies of the sinusoidal analog scanning signal, the sinusoidal digital output signal is fed to the digital-to-analog converter at a higher output rate and with a smaller word width than in a case of lower frequencies of the sinusoidal analog scanning signal.

10. The method as recited in claim 9, wherein a plurality of sinusoidal digital output signals are generated from the at least one analog scanning signal, the sinusoidal digital output signals having a varied signal period compared to the sinusoidal analog scanning signal, and the sinusoidal digital output signals having different output rates and different word widths.

11. The method as recited in claim 10, wherein the sinusoidal digital output signals are fed in parallel to a switching unit which feeds one of the parallelly received digital output signals to the digital-to-analog converter in dependence upon the frequency of the sinusoidal analog scanning signal.

12. The method as recited in claim 9, wherein a plurality of mutually phase-shifted position-dependent sinusoidal analog scanning signals of equal frequency are generated, and wherein a plurality of mutually phase-shifted sinusoidal digital output signals having a varied signal period compared to the sinusoidal analog scanning signals are generated therefrom.

13. The method as recited in claim 12, wherein two sinusoidal analog scanning signals which are phase-shifted by 90° with respect to each other are fed to a module, and wherein two sinusoidal digital output signals which are phase-shifted by 90° with respect to each other and have a varied signal period compared to the sinusoidal analog scanning signals are generated therefrom.

* * * * *